(12) United States Patent
Zimmermann (10) Patent No.: US 12,311,334 B2
(45) Date of Patent: May 27, 2025

(54) METHOD FOR EMPTYING A DEVICE FOR PRODUCING GRANULES OR EXTRUDATES

(71) Applicant: Glatt Gesellschaft mit beschränkter Haftung, Binzen (DE)

(72) Inventor: Dirk Zimmermann, Wehr (DE)

(73) Assignee: Glatt Gesellschaft mit beschränkter Haftung, Binzen (DE)

(*) Notice: Subject to any disclaimer, the term of this patent is extended or adjusted under 35 U.S.C. 154(b) by 555 days.

(21) Appl. No.: 17/602,523

(22) PCT Filed: Mar. 24, 2020

(86) PCT No.: PCT/EP2020/058116
§ 371 (c)(1),
(2) Date: Oct. 8, 2021

(87) PCT Pub. No.: WO2020/207784
PCT Pub. Date: Oct. 15, 2020

(65) Prior Publication Data
US 2022/0161213 A1    May 26, 2022

(30) Foreign Application Priority Data
Apr. 10, 2019   (DE) .................... 10 2019 205 147.2

(51) Int. Cl.
*B01J 2/10*  (2006.01)
*B01J 2/20*  (2006.01)
*B65G 65/46* (2006.01)

(52) U.S. Cl.
CPC . *B01J 2/10* (2013.01); *B01J 2/20* (2013.01); *B65G 65/46* (2013.01)

(58) Field of Classification Search
CPC ....... B01J 2/10; B01J 2/20; B29B 9/16; F26B 2200/08; B29C 31/02
See application file for complete search history.

(56) References Cited

U.S. PATENT DOCUMENTS

| | | | |
|---|---|---|---|
| 4,465,447 | A | 8/1984 | Cheigh et al. |
| 4,487,339 | A | 12/1984 | Ellwood |

(Continued)

FOREIGN PATENT DOCUMENTS

| | | |
|---|---|---|
| CN | 1955092 A | 5/2007 |
| CN | 202068766 U | 12/2011 |

(Continued)

*Primary Examiner* — Jacob T Minskey
*Assistant Examiner* — Elisa H Vera
(74) *Attorney, Agent, or Firm* — The Webb Law Firm (57) ABSTRACT

A method for emptying a device for producing granules or extrudates. The device includes a container having an inlet for the material to be treated, an inlet for a liquid, a stirring device, an outlet for said intermediate product, and an emptying pipe having an inlet for the intermediate product and an outlet for the granules or extrudate as well as a conveying device conveying the intermediate product from the inlet of the emptying pipe in the direction of the outlet of the emptying pipe. The method includes the steps of: producing the intermediate product from the material to be treated and the liquid in the container; moving the emptying pipe from the closed position with respect to the container into an open position with respect to the container; and conveying the intermediate product from the container and via the conveying devices.

20 Claims, 4 Drawing Sheets

(56) References Cited

U.S. PATENT DOCUMENTS

| | | | |
|---|---|---|---|
| 4,655,701 | A | 4/1987 | Moriya |
| 4,756,921 | A | 7/1988 | Calandro et al. |
| 5,077,019 | A * | 12/1991 | Tatsumi .................. B29C 31/02 422/138 |
| 5,240,400 | A | 8/1993 | Fujimoto et al. |
| 7,275,703 | B2 | 10/2007 | Bacher et al. |
| 9,216,522 | B2 | 12/2015 | Feichtinger et al. |
| 2008/0203200 | A1 | 8/2008 | Waldron et al. |
| 2009/0321682 | A1 * | 12/2009 | Kajikawa ................. C08J 7/123 252/194 |
| 2010/0140381 | A1 | 6/2010 | Weigerstorfer et al. |
| 2017/0173645 | A1 | 6/2017 | Hashimoto |
| 2018/0147747 | A1 | 5/2018 | Brzezowsky et al. |
| 2019/0001302 | A1 * | 1/2019 | Shuto ...................... A61L 15/24 |
| 2022/0203315 | A1 | 6/2022 | Zimmermann |

FOREIGN PATENT DOCUMENTS

| | | |
|---|---|---|
| CN | 102963735 A | 3/2013 |
| CN | 103857502 A | 6/2014 |
| CN | 105346045 A | 2/2016 |
| CN | 205007890 U | 2/2016 |
| CN | 105383950 A | 3/2016 |
| CN | 205517608 U | 8/2016 |
| CN | 206463914 U | 9/2017 |
| CN | 107619671 A | 1/2018 |
| CN | 207042430 U | 2/2018 |
| CN | 107848147 A | 3/2018 |
| CN | 207140152 U | 3/2018 |
| CN | 207511484 U | 6/2018 |
| CN | 207533086 U | 6/2018 |
| CN | 207956877 U | 10/2018 |
| CN | 108745069 A | 11/2018 |
| CN | 208377956 U | 1/2019 |
| CN | 109569423 A | 4/2019 |
| DE | 2924342 A1 | 11/1980 |
| DE | 3313517 A1 | 10/1983 |
| DE | 4442710 C1 | 11/1995 |
| DE | 202007008256 U1 | 11/2007 |
| EP | 0019594 A1 | 11/1980 |
| GB | 252597 | 6/1926 |
| GB | 465796 | 5/1937 |
| JP | S5021013 | 7/1975 |
| JP | 6422333 A | 1/1989 |
| JP | H04330929 A | 11/1992 |
| JP | 3010304 U | 2/1995 |
| JP | H8188258 A | 7/1996 |
| JP | 20006139 A | 1/2000 |
| JP | 200279071 A | 3/2002 |
| JP | 2002253943 A | 9/2002 |
| JP | 200363918 A | 3/2003 |
| JP | 2005160417 A | 6/2005 |
| JP | 2006175402 A | 6/2006 |
| JP | 2006526520 A | 11/2006 |
| JP | 5158732 B1 | 12/2012 |
| JP | 2016123971 A | 7/2016 |
| KR | 1020110059097 A | 6/2011 |
| WO | 9106365 A1 | 5/1991 |

\* cited by examiner

METHOD FOR EMPTYING A DEVICE FOR PRODUCING GRANULES OR EXTRUDATES

CROSS-REFERENCE TO RELATED APPLICATIONS

This application is the United States national phase of International Application No. PCT/EP2020/058116 filed Mar. 24, 2020, and claims priority to German Patent Application No. 10 2019 205 147.2 filed May 10, 2019, the disclosures of which are hereby incorporated by reference in their entirety.

BACKGROUND

Field

The invention relates to a method for emptying a device for manufacturing granulates or extrudates, wherein the device comprises a container with an inlet for the material to be treated, with an inlet for a liquid, with a stirring device for manufacturing an intermediate product from the material to be treated and from the liquid and with an outlet for the intermediate product, and with an emptying pipe.

Related Art

In industrial processes, in particular in the pharmaceutical industry, devices are very often used for manufacturing granulates and extrudates, in order to subsequently post-treat these for example by way of drying apparatus, in particular fluidised bed apparatus or spouted bed apparatus. Hereby, the device for manufacturing granulates or extrudates are connected to the drying apparatus in a direct manner via a transfer conduit. The devices must always be emptied, so that the granulate or extrudate can be treated further.

The patent document DE 33 13 517 A1 discloses a granulator with a vertical raw material inlet and with a rotor which rotates about the vertical axis. The material is firstly reduced in size by way of knives which interact with one another in a horizontal plane, and then by further knives which interact with one another in a vertical plane. A perforated plate prevents a premature exit of raw material out of the region of the first knives, and the finished granulate can exit out of the region of the further knives through openings of a cylindrical sieve. The rotor-side knives and the openings in the cylindrical sieve can be arranged in the most varied of manners with regard to increasing the throughput. The material discharge is assisted by a vaned wheel which is seated on a shaft and rotates in the space between the sieve and the outer wall of the housing. By way of the action of the centrifugal force of the vaned wheel, the finished granulate grains are conveyed out of the space through the housing outlet into a collection container.

The utility model document DE 20 2007 008 256 U1 discloses a mixing granulator with a mixing container and a stirring device which is located therein and which comprises a vertically aligned drive shaft and with regard to which the mixing container is designed in an arched manner at its base side and mixing tools which are designed in a manner adapted to the arched base are provided, wherein the base is designed in a closed manner, the mixing container comprises a run-out opening in the wall region, adding devices for liquid and solid material are provided in the actual mixing containers and a size-reducing and conveying device which assists in the discharge of the mixed and granulated product is provided within the mixing container in front of the run-out opening, wherein the mixing container at its upper side comprises a cover and the size-reducing and conveying device is surrounded by a protective housing. The size-reducing and conveying device thus effects a size reduction, in the case that larger product lumps are predominantly present, and simultaneously a feed conveying of the granulated product to the outlet opening. The size reducing and conveying device thus assists in the emptying of the mixing container via the run-out opening which is arranged laterally on the mixing container.

SUMMARY

With regard to the devices according to the state of the art, it is generally common to carry out the emptying of the in particular moist granulate via an exit opening which is arranged laterally on the device. With the help of a rotating stirring device and gravitational force, the manufactured granulate is conveyed downstream of the exit opening, i.e., after the sieve, into a drying device, usually by way of gravitational force or pneumatically. Concerning this type of emptying, the mass flow which is conveyed out of the device is not constant over the complete emptying process. Usually, the mass flow which is conveyed out of the device at the beginning of the emptying process is larger than at the end of the emptying process, by which means the produced granulate falls in lump form into the connecting sieve. On account of this, the constructional space for the emptying is dimensioned generously, in order to prevent a blockage of the production facility. The emptying of the device worsens with a decreasing mass flow, since from now on it is difficult for the granulate to be conveyed out of the device or through the stirring device. For this reason, too, the emptying times are indeed very long and are not reproducible, depending on the product characteristics, which is a further disadvantage of the devices which are disclosed in the state of the art.

It is therefore the object of the invention to provide a method for emptying a device for manufacturing granulates or extrudates, which overcomes the disadvantages of the state of the art and in particular renders possible precisely definable emptying times in dependence on the product characteristics of the materials to be processed.

This object is achieved with a method of the initially mentioned type in that the device comprises an emptying pipe, said emptying pipe comprising an inlet for the intermediate product and an outlet for the granulate or extrudate as well as a conveying device which conveys the intermediate product from the inlet of the emptying pipe in the direction of the outlet of the emptying pipe, wherein the emptying pipe which is rotatable about an axis is arranged on the container in a manner such that the emptying pipe with respect to the container can be brought between an open position and a closure position, comprising the steps a) manufacturing the intermediate product from the material to be treated and from the liquid in the container, which is closed by the emptying pipe, wherein the stirring device is at least temporarily active, b) bringing the emptying pipe out of the closure position with respect to the container into an open position with respect to the container and c) conveying the intermediate product out of the container and via the conveying device of the emptying pipe out of the outlet of the emptying pipe.

Advantageously, by way of the embodiment of the method in accordance with the invention, it is possible to manufacture an intermediate product from a material to be treated and from a liquid, and to subsequently convey the intermediate product out of the device via the emptying pipe which is situated in the open position, and which comprises a conveying device, and to granulate or extrude it. Hereby, in the open position, the outlet of the container of the device and the inlet of the emptying pipe of the device are at least partly congruent. The intermediate product, which is manufactured in the container, given the emptying procedure is transported into the emptying pipe by way of the stirring device and/or gravitational force and there is conveyed out of the device with an adjustable, preferably constant mass flow by way of the conveying device. On account of this, with regard to the device according to the invention the emptying times can be reproduced in a precisely definable or defined and accordingly exact manner in dependence on the product characteristics.

Further advantageous designs of the preferred method are specified in the following embodiments.

According to a method which is advantageous in respect of this, the stirring device is brought into a defined position before step b). Advantageously, by way of this, the rotation of the emptying pipe from the closure position into the open position is simplified or made simpler or improved, for example by way of lifting the stirring device or stopping the stirring device in a defined position in the container. Hereby, advantageously the stirring device is moved into a predefined position by way of lifting, or the stirring vanes of the stirring device are stopped at a predefined angle in the container. Damage to the device is therefore avoided.

According to an advantageous further development of the method, on bringing the emptying pipe out of the closure position with respect to the container into an open position with respect to the container according to step b), the emptying pipe is rotated about an angle of 10° to 300°, in particular essentially about an angle of 180°. Preferably, on bringing the emptying pipe out of the closure position with respect to the container into an open position with respect to the container according to step b), the emptying pipe is rotated in a manual or automated manner. An improved degree of automation can be achieved for example by way of the automated rotation of the emptying pipe.

According to an additional embodiment of the method according to the invention, the device comprises a fluidisation apparatus and the extrudate or granulate which exits out of the outlet of the emptying pipe according to step c) is treated, in particular dried, in the fluidisation apparatus. Preferably, hereby the inlet of the fluidisation apparatus comprises a feed conduit for fluids, in particular gases. The transfer of the extrudate or granulate which exits out of the outlet of the emptying pipe into the fluidisation apparatus, preferably a fluidised bed or spouted bed, is encouraged or assisted by the feed of a fluid, in particular fluidisation gas, preferably an inert gas. Particularly preferably, the inlet, i.e., an inlet conduit, of the fluidisation apparatus comprises an onflow base or is at least partly designed as an onflow base. By way of an inlet of the fluidisation apparatus, which is designed in such a manner, the extrudate or granulate which exits out of the outlet of the emptying pipe of the device is fluidised in a direct manner without the extrudate or granulate coming into contact with the inner surface of the inlet of the fluidisation apparatus. A furthermore reduced surface which is contacted by the product and consequently a reduced product loss hence results.

An additional advantageous embodiment of the method according to the invention envisages the device comprising a further nozzle, wherein the device is cleaned at least temporally during the closure position. By way of this, it is possible to clear or clean the emptying pipe from product residues, so that the emptying pipe is clean given the next emptying of the container and the new charge can be transported or conveyed out of the device free of contamination or residues of the preceding charge. According to a preferred design, the nozzle is arranged on a rail. In particular, the rail is telescopic. By way of this, the nozzle can be positioned along the inlet of the emptying pipe of the device in an optimal manner, in order to optimally clean every nook and cranny of the emptying pipe. Very particularly preferably, the nozzle can be or is arranged in a displaceable manner in the longitudinal and transverse direction to the nozzle. Contamination or residues of the previous charge can be removed in an improved manner and thus the emptying pipe can be optimally cleaned, by way of the displaceability of the nozzle in particular in the transverse direction to the inlet, i.e., closer onto the inlet.

According to an advantageous embodiment of the method according to the invention, the device for carrying out the method is a subsequently described device.

The device for manufacturing granulates or extrudates comprises a container with an inlet for the material to be treated, with an inlet for a liquid, with a stirring device for manufacturing an intermediate product from the material to be treated and from the liquid, and with an outlet for the intermediate product, and an emptying pipe, wherein the device comprises an emptying pipe which comprises an inlet for the intermediate product and an outlet for the granulate or extrudate as well as a conveying device which conveys the intermediate product from the inlet of the emptying pipe in the direction of the outlet of the emptying pipe, wherein the emptying pipe which is rotatable about an axis is arranged on the container in a manner such that the emptying pipe with respect to the container can be brought between an open position and a closure position.

Advantageously, by way of the embodiment of the device, it is possible to manufacture an intermediate product from a material to be treated and from a liquid, and to subsequently convey the intermediate product out of the device via the emptying pipe which is situated in the open position, and which comprises a conveying device, and to granulate or extrude it.

In the open position, the outlet of the container of the device and the inlet of the emptying pipe of the device are at least partly congruent. A position at which the outlet of the container of the device and the inlet of the emptying pipe of the device are not at least partly congruent is accordingly denoted as the closure position. In the open position, the intermediate product can therefore be transferred from the container via its outlet and via the inlet of the emptying pipe into this. In the closure position, a transfer of the intermediate product from the container into the emptying pipe is not possible. In order to bring the emptying pipe from a closure position into an open position, the emptying pipe is rotatable in a manual or automated manner, for example by way of a drive unit, in particular a torque motor or servomotor. The emptying pipe is preferably rotated by 180°, since a good cleaning of the emptying pipe can be achieved in the closure position by way of this.

The intermediate product, which is manufactured in the container, given the emptying procedure, i.e. in an open position of the emptying pipe with respect to the container, is transported into the emptying pipe by way of the stirring device and/or gravitational force. In the emptying pipe, the intermediate product is conveyed out of the device with an adjustable mass flow by way of the conveying device. The mass flow which is generated by the conveying device is preferably constant. Inherent of the adjustable mass flow out of the container and out of the emptying pipe, with regard to the device according to the invention, the emptying times can be reproduced in a precisely definable or defined and accordingly exact manner in dependence on the product characteristics.

According to a preferred further development of the device in respect of this, the inlet for the liquid is designed in the form of a nozzle, in particular a single-component or multi-component nozzle. This has the advantage that the liquid, for example in the form of a pure substance, an emulsion, suspension or slurry can be admetered to the material, which is to be treated in the container, in an exact and precisely metered manner. The liquid is most preferably a granulating liquid.

According to a further development of the device, the emptying pipe is arranged below the container. The arrangement below the emptying pipe ensures an improved emptying for example on account of the additional effect of gravity upon the manufactured intermediate product during the emptying procedure. The emptying pipe which is arranged below the container is arranged in a section plane which runs at a distance parallel to a section plane which runs through a vertical middle axis of the container. By way of this arrangement of the emptying pipe with respect to the container, the intermediate product can be transferred out of the container into the emptying pipe particularly well. According to a special development of the device, the distance is equal to zero, so that the emptying pipe is arranged in a section plane which runs through a vertical middle axis of the container. In this special design, the area of the outlet of the container and the area of the inlet of the emptying pipe can be designed or are designed particularly large.

According to an additional further development of the invention, the stirring device comprises stirring vanes, in particular stirring vanes which are designed at least partly in a flexible manner. The stirring vanes of the stirring device can be designed rigidly and/or at least partly flexibly. By way of the at least partial flexibility of the stirring vanes, it is not absolutely necessary to bring the stirring device into a defined position on bringing the emptying pipe from a closure position into an opening position, but the stirring device can simply be stopped in the container in an arbitrary position and remain there. The stirring vanes according to this further development are compliant on bringing the emptying pipe from a closure position into an open position due to their flexibility, so that no damage to the stirring vanes of the stirring device and/or to the emptying pipe occurs.

According to an additional advantageous embodiment of the device, the conveying device is drivable or is driven by a shaft. By way of this, it is possible to drive the conveying device for example by way of a drive unit, in particular a servomotor or torque motor, which is coupled to the shaft for example via a gear, so that the angular speed of the conveying device can be set in a precise manner. The shaft which drives the conveying device is preferably a hollow shaft.

According to a further advantageous further development of the device, the conveying device is a conveying screw, a spiral conveyor, or the like. The conveying device preferably comprises zones, wherein the flight depth of the conveying device is different in the zones. By way of this, it is possible to compress the conveyed intermediate product to a different extent on the way in the direction of the outlet of the emptying pipe and to possibly press it through the outlet of the emptying pipe.

Advantageously, the outlet of the emptying pipe is designed as a sieve device. By way of this, it is possible for the granulate or extrudate to be manufactured directly at the outlet of the emptying pipe on conveying out of the emptying pipe. The sieve device preferably comprises a sieve and a rotor. The intermediate product which is conveyed out of the emptying pipe is sheared or scraped off at the sieve of the sieve device by way of the rotor, so that granulates or extrudates drop out of the sieve of the sieve device. Particularly preferably, the sieve device is designed in a cone-like manner. Very particularly preferably, the openings of the sieve of the sieve device are designed in a round, oval, rectangular and/or square manner. The rotor is preferably designed in the manner of an anchor and is adapted to the inner surface of the sieve of the sieve device.

In a very particularly preferred further development of the device according to the invention, the conveying device and the rotor are designed as one piece as a component unit of the emptying pipe. The component unit is then drivable or driven by a common shaft. By way of this, the device comprises fewer components and is therefore manufacturable in a less expensive manner. Furthermore, the design of the device according to the invention is simpler on account of the single-piece component unit which comprises the conveying device and rotor.

According to an additional advantageous further development of the device, the rotor is drivable or driven by a shaft. The shaft which drives the rotor is preferably drivable or driven independently of the shaft which drives the conveying device. Very particularly preferably, the shaft which drives the rotor is designed coaxially to the shaft which drives the conveying device. Most preferably, the shaft which drives the rotor is arranged in the hollow shaft which drives the conveying device.

According to an additional embodiment of the device, the device comprises a drying apparatus which comprises an inlet for the extrudate or granulate, wherein the outlet of the emptying pipe is connectable or connected to an inlet of the drying apparatus. The transfer pipe for the transport of the moist granulates or extrudates into the drying apparatus is completely done away with due to the direct coupling between the outlet of the emptying pipe the device and the inlet of the drying apparatus. On account of this, a significantly reduced surface which is contacted by the product and consequently a reduced product loss occurs compared to a conventional granulation line, i.e. granulator, transfer pipe and drying apparatus. The outlet of the emptying pipe can furthermore project into the fluidised bed of the drying apparatus. By way of this, the surface which is contacted by the product is further reduced given the transport of the still moist granulate from the granulation unit into the fluidisation apparatus.

Hereby, the inlet of the drying apparatus preferably comprises a feed conduit for fluids, in particular gases. By way of the feed of a fluid, in particular a fluidisation gas, preferably an inert gas, the transfer of the extrudate or granulate which exits from the outlet of the emptying pipe, into the drying apparatus, preferably a fluidised bed or spouted bed, is encouraged or assisted and the extrudates or granulates are at least partly fluidised. Particularly preferably, the inlet of the drying apparatus comprises an onflow base or is designed at least partly as an onflow base. An onflow base is designed for example in the form of a perforated plate, so that a fluidisation medium can pass through the onflow base and fluidises the granulates or extrudates, similar to a fluidisation apparatus. By way of an inlet of the drying apparatus, which is designed in such a manner, the extrudate or granulate which exits from the outlet of the emptying pipe of the device is fluidised in a direct manner without the extrudate or granulate coming into contact with the inner surface of the inlet of the drying apparatus. Hence a further reduced surface which is contacted by the product and consequently a lower product loss results.

According to an additional advantageous embodiment of the device, the device comprises a further nozzle for cleaning the emptying pipe in the closure position of the emptying pipe. By way of this, it is possible to free or clean the emptying pipe of product residues, so that the emptying pipe is clean given the next emptying and the new charge can be transported or conveyed out of the device free of contamination or residues from the preceding charge. According to a preferred design, the nozzle is arranged on a rail. Particularly preferably, the rail is telescopic. By way of this, the nozzle can be positioned along the inlet of the emptying pipe of the device in an optimal manner, in order to clean every nook and cranny of the emptying device in an optimal manner. Very particular preferably, the nozzle is or can be arranged in a displaceable manner in the longitudinal and transverse direction to the nozzle. Contamination and residues of the preceding charge can be removed in an improved manner by way of the displaceability of the nozzle in particular in the transverse direction to the inlet, i.e., closer onto the inlet, and the emptying pipe can thus be optimally cleaned.

The method is preferably carried out with the aforementioned device.

BRIEF DESCRIPTION OF THE DRAWINGS

The invention is hereinafter explained in more detail by way of the accompanying drawing. There are shown in FIG. 1 a plan view of an embodiment example of a preferred device with an emptying pipe which is arranged in a section plane A-A, wherein the emptying pipe is situated in a closure position, FIG. 2 a section of the preferred device according to section plane A-A in FIG. 1 with a detail B in the region of an outlet of the emptying pipe, wherein the emptying pipe is situated in a closure position, FIG. 3 a detailed view in the region of the outlet of the emptying pipe according to the detail B in FIG. 2, wherein the emptying pipe is situated in a closure position, FIG. 4 a plan view upon an embodiment example of a preferred device with an emptying pipe which is arranged in a section plane A-A, wherein the emptying pipe is situated in an open position, and runs out into an inlet of the drying apparatus, FIG. 5 a section of the preferred device according to the section plane A-A in FIG. 4 with a detail C in the region of the outlet of the emptying pipe, wherein the emptying pipe is situated in an open position, and runs out into an inlet of the drawing device, FIG. 6 a detailed section in the region of an outlet of the emptying pipe according to detail C in FIG. 5, wherein the emptying pipe is situated in an open position, and runs out into an inlet of the drying apparatus, FIG. 7 a perspective representation of a first embodiment of the emptying pipe, FIG. 8 a perspective representation of a second embodiment of the emptying pipe and FIG. 9 a perspective representation of a third embodiment of the emptying pipe.

DETAILED DESCRIPTION

Figure 1:
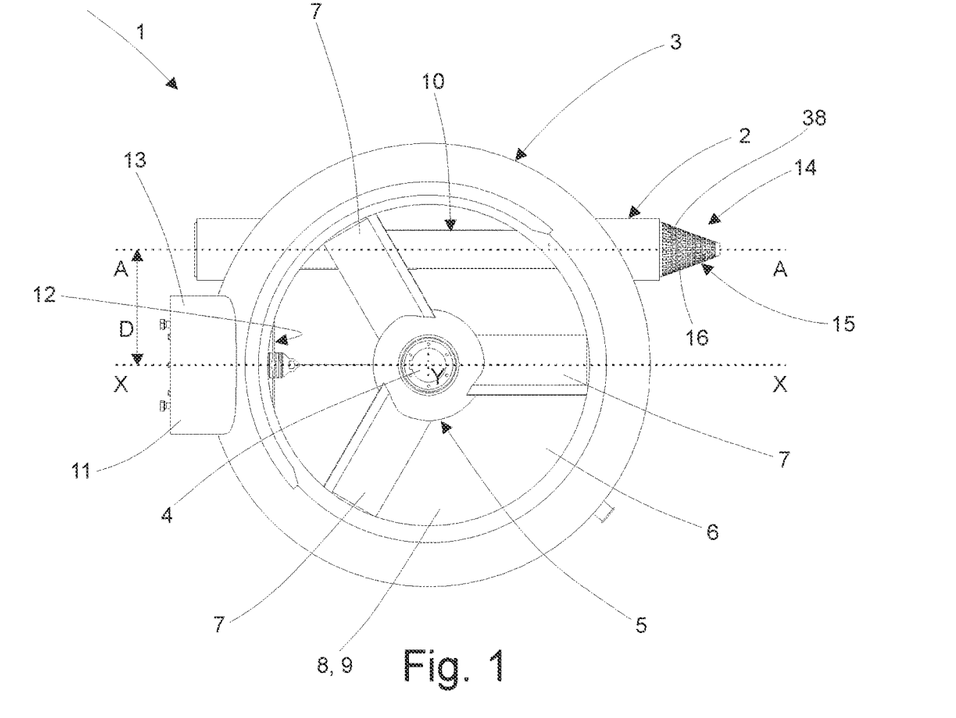

A plan view of an embodiment example of a preferred device 1 with an emptying pipe 2 which is arranged in a section plane A-A is shown is FIG. 1, wherein the emptying pipe 2 is situated in a closure position.

The device 1 which is represented in the embodiment example is designed as a vertical granulator, wherein other granulating construction types are likewise possible. The device 1 comprises a container 3, wherein a stirring device 5 is arranged in the container 3 on a drive shaft 4. The drive shaft 4 in the container 3 is designed in a preferably telescopic manner on a vertically aligned axis Y. By way of this, the stirring device 5 is designed in a height-adjustable manner with respect to the base 6 of the container 3. By way of this, it is possible to vary a distance of the stirring device 5 to the base 6 of the container 3 and to lift and lower the stirring device 5.

The stirring device 5 in the embodiment example comprises three stirring vanes 7 but is not limited to this number of stirring vanes 7. The drive shaft 4 which carries the stirring device 5 is driven by a drive unit, preferably a motor, particularly preferably an electric motor, very particularly preferably a servomotor or torque motor, said drive unit not being shown in FIG. 1. By way of such a design, it is possible to stop the stirring device 5 with its stirring vanes 7 at any arbitrary position of the stirring vanes 7 in the container 3 via a control unit which is not shown, and which is connected to the motor, and to therefore position the stirring device 5 with its stirring vanes 7 in a precise, for example predefined position. Furthermore, a lifting or lowering of the stirring device 5 which comprises the stirring vanes 7 is possible by way of the drive shaft 4 which is preferably designed in a telescopic manner.

The container 3 comprises an inlet 8 for a material to be treated and an inlet 9 for a liquid, in particular for a granulating liquid. Preferably and represented differently to FIG. 1, the inlet 9 for a liquid is designed in the form of a nozzle, in particular a single-component or multi-component nozzle. This has the advantage that the liquid, for example in the form of a pure substance, an emulsion, suspension, or slurry can be added to the material, which is to be treated in the container 3, in an exact and precisely metered manner. A granulating liquid is most preferably used. In the embodiment example, the inlet 8 for the material to be treated corresponds to the inlet 9 of the liquid.

In the container 3, the material to be treated is mixed with the liquid and processed into an intermediate product, by way of the stirring device 3. The container 3 accordingly comprises an outlet 10 for the intermediate product which is manufactured in the container 3 from the material to be treated and from the liquid.

Here, the outlet 10 is arranged in the base 6 of the container 3. In the embodiment example, the container 3 for example for the size reduction and homogenisation of the intermediate product additionally comprises choppers 12 which are driven by a drive unit 11. Furthermore, the device 1 comprises a control unit 13 which controls the complete device 1 and its process sequences.

In the embodiment example which is shown in FIG. 1, an emptying pipe 2 is arranged below the container 3. The emptying pipe 2 which is situated in a closure position in FIG. 1 is arranged in a section plane A-A. The emptying pipe 2 which is arranged below the container 3 is arranged in a section plane A-A which runs at a distance D parallel to a section plane X-X which runs through a vertical middle axis Y of the container 3.

An outlet 14 of the emptying pipe 2 is designed as a sieve device 15 in the embodiment example of FIG. 1. By way of this, it is possible to manufacture the granulate or extrudate directly at the outlet 14 of the emptying pipe 2 on conveying out of the emptying pipe 2. The sieve device 15 preferably comprises a sieve 38 and a rotor which is not shown here. By way of this rotor, the intermediate product which is conveyed out of the emptying pipe 2 is sheared or stripped away at the sieve 38 of the outlet 14, said outlet being devised as a sieve device 15, so that granulates drop out of the sieve 38 of the sieve device 15. The sieve device 15 in the embodiment example is designed in a cone-like manner and comprises square openings 16. The openings 16 of the sieve 38 of the sieve device 15 can also be designed in a round, oval, rectangular and/or square manner. The rotor which is not represented is preferably designed in the manner of an anchor and is adapted to the inner surface 33 of the sieve of the outlet 14, said outlet being designed as a sieve device 15.

Figure 2:
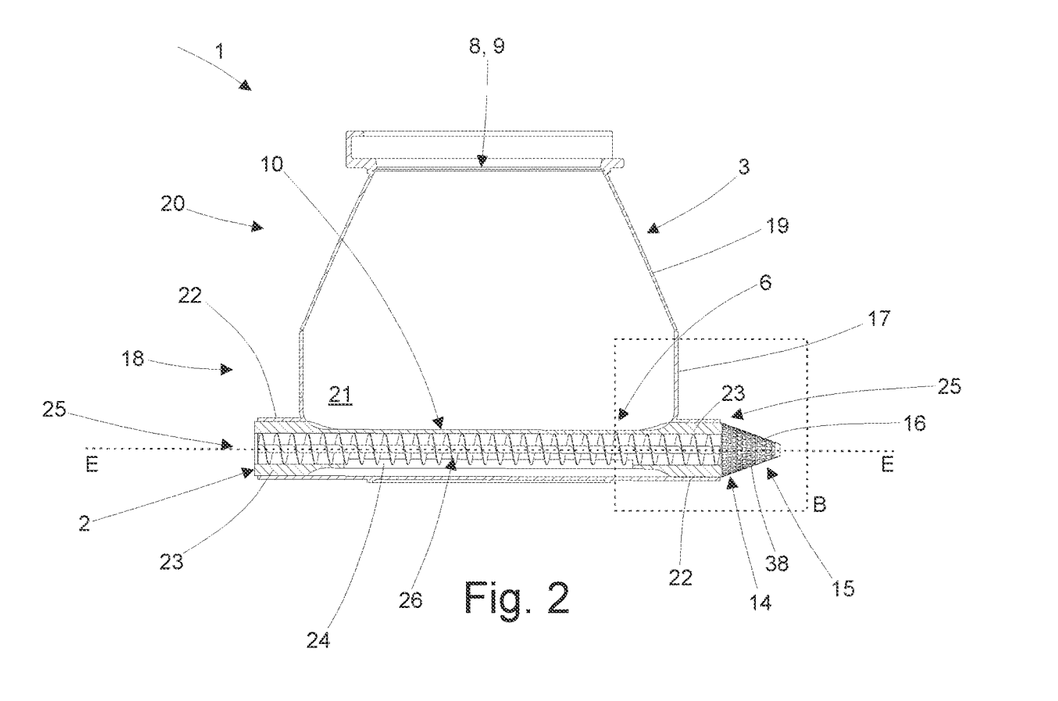

A section of the preferred device 1 according to the section plane A-A in FIG. 1 with a detail B in the region of the outlet 14 of the emptying pipe 2 is shown in FIG. 2, wherein the emptying pipe 2 is situated in a closure position.

The container 3 below which the emptying pipe 2 is arranged, in the embodiment example comprises a lower circular container part 18 which comprises container walls 17, and a n upper conical container part 20 which comprises container walls 19. The lower and the upper container part 19, 20 together with the base 6 of the container 3 encompass a container interior 21.

The inlet 8 for the material to be treated and the inlet 9 for the liquid, in the embodiment example are arranged in the upper region of the conical container part 20.

An emptying pipe 2 is arranged on the base 6 of the container 3 below the container 3. The emptying pipe is hereby arranged in a wall 22 of the base 6 of the container 3 in a rotatable manner, wherein the emptying pipe 2 can be brought from a closure position into an open position. In FIG. 2, the emptying pipe 2 is situated in the closure position. The emptying pipe 2 comprises a wall 23. The wall 23 comprises an inlet 24 for the emptying pipe 2. The inlet 24 preferably has the dimensions of the outlet 10 of the container 3. Furthermore, the emptying pipe 2 at on one of its two end-faces 25 comprises the outlet 14 which is designed as a sieve device 15. A rotor which is not shown in FIG. 2 and which is adapted to the inner wall of the sieve 38 of the sieve device 15 is arranged in the outlet 14.

The emptying pipe 2 of the device 1 comprises a conveying device 26 which in particular is designed as a conveying screw, spiral conveyor or the like and conveys in the longitudinal direction of the emptying pipe 2 along the middle axis E-E in the direction of the outlet 14. In the embodiment example, which is represented in FIG. 2, the conveying device 26 which is designed as a conveying screw comprises a zone with a constant flight depth. The conveying device 26 however preferably comprises different zones, wherein preferably the flight depth of the conveying device 26 is different in the different zones. The conveying device 26 is driven by a shaft 27 which is arranged on a middle axis E-E of the emptying pipe 2. By way of this, it is possible to drive the conveying device 26 for example by way of a drive unit, in particular servomotor or torque motor, which is coupled to the shaft 27 for example via a gear which is not shown, so that the speed and in particular the angular speed of the conveying device 26 can be set in an exact manner. Preferably, the shaft 27 which drives the conveying device 26 is a hollow shaft. Hereby, a further shaft which is not shown would drive the rotor, which is not shown here, in the shaft 27 which is designed as a hollow shaft. By way of this, it is possible to rotate the rotor, which is not shown, also oppositely to the shaft 27 by way of a drive unit which is likewise not shown.

Figure 3:
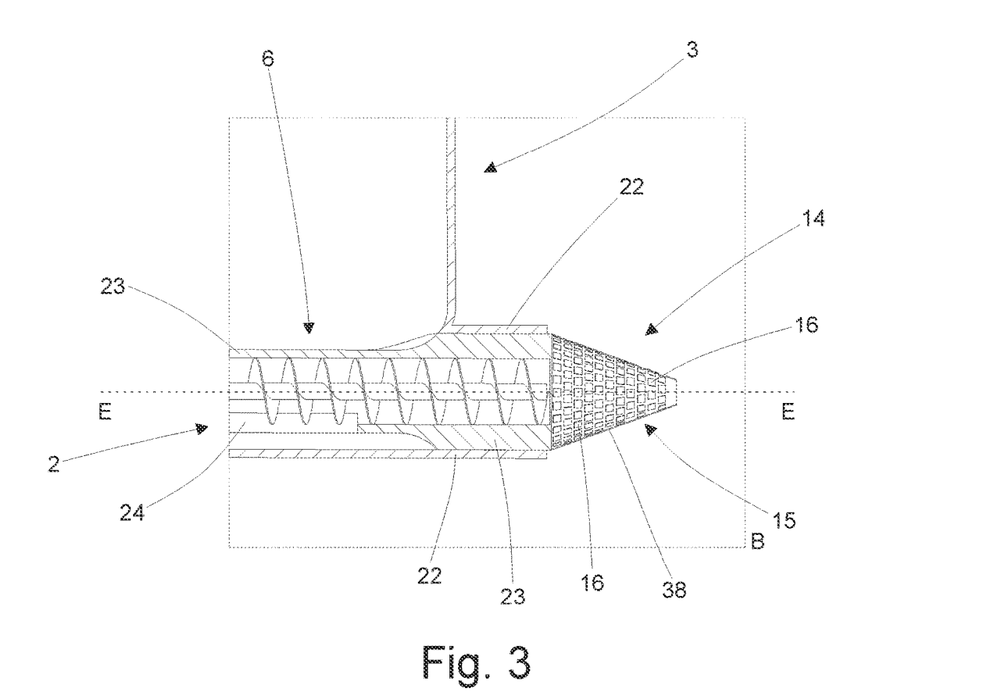

FIG. 3 shows a detailed section in the region of the outlet 14 of the emptying pipe 2 according to the detail B in FIG. 2, wherein the emptying pipe 2 is situated in a closure position. In the closure position, the intermediate product cannot be transferred from the container 3 into the emptying pipe 2. The emptying pipe 2 is situated in a closure position, so that the intermediate product can be manufactured in the container 3 from the material to be treated and the liquid. The wall 23 of the emptying pipe 2 in the closure position at least partly forms the base 6 of the container 3, so that the intermediate product cannot be transferred from the container 3 into the emptying pipe 2 in the closure position. In the embodiment example, the inlet 24 of the emptying pipe 2 is arranged on the side which is away from the base 6 of the container 3. The sieve device 15 forms the outlet 14 of the emptying pipe 2, wherein a rotor which is not shown is arranged within the sieve 38 of the sieve device 15. The sieve 38 of the sieve device 15 comprises openings 16 for the discharge of the intermediate as a granulate or extrudate out of the outlet 14 of the emptying pipe 2 which is designed as a sieve device 15.

The emptying pipe 2 is arranged in a wall 22 which is provided for this, and which forms a part of the container 3, in particular of the base 6. Other types of the arrangement of the emptying pipe 2 on the container 3 are also conceivable.

Figure 4:
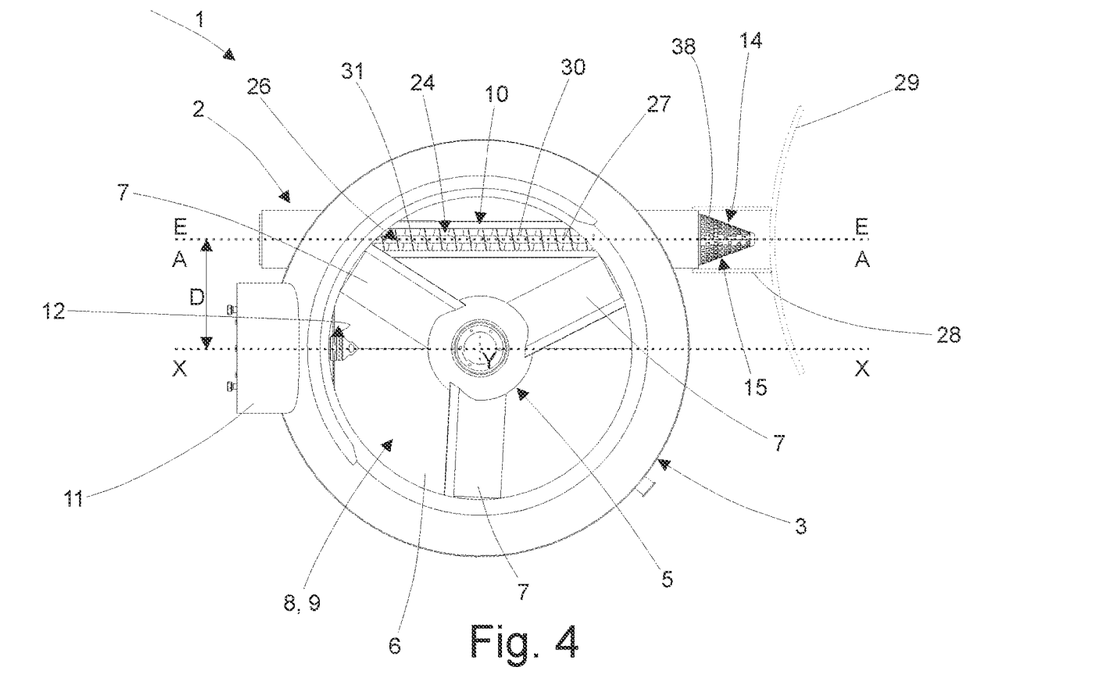

FIG. 4 shows a plan view upon embodiment example of a preferred device 1 with a emptying pipe 2 which is arranged in a section plane A-A, wherein the emptying pipe 2 is situated in an open position, and runs out into an inlet 28 which is represented dashed, of a drying apparatus 29 which is likewise represented in a dashed manner, preferably a fluidisation apparatus, particularly preferably fluidised bed or spouted bed apparatus.

The material which is to be treated and which is fed to the container 3 via the inlet 8 is mixed in the container 3 by way of the stirring device 5 which comprises stirring vanes 7 and is processed into an intermediate product. Additionally, the container 3 in the embodiment example comprises a chopper 12 for example for the size reduction and homogenisation of the intermediate product, said shopper 12 being driven by a drive unit 11. The container 3 comprises an outlet 10 for the intermediate product which is manufactured in the container 3 from the material to be treated and from the liquid. The outlet 10 is arranged in the base 6 of the container 3.

In the embodiment example which is shown in FIG. 1, an emptying pipe 2 is arranged below the container 3. The emptying pipe 2 which is located in an open position in FIG. 1 is arranged in a section plane A-A. The emptying pipe 2 which is arranged below the container 3 is arranged in a section plane A-A which runs at a distance D parallel to a section plane X-X which runs through a vertical middle axis Y of the container 3. The outlet 14 of the emptying pipe 2 which in the embodiment is designed as a sieve device 15 which comprises the sieve 38 runs out into an inlet 28 which is represented dashed, of a drying apparatus 29 which is likewise represented dashed. A fluidisation apparatus, for example a fluidised bed or spouted bed apparatus is conceivable as a drying apparatus 29.

In contrast to the device 1 which is constructionally equal and is represented in FIG. 1, the emptying pipe 2 is in an open position in FIG. 4. In the open position, the manufactured intermediate product can be transferred from the container 3 into the emptying pipe 2. In the open position, the outlet 10 of the container 3 of the device 1 and the inlet 24 of the emptying pipe 2 of the device 1 are at least partly congruent. In the embodiment example, the inlet 24 of the emptying pipe 2 comprises an inlet area 30 which corresponds to the outlet 10 of the container 3. The inlet area 30 of the inlet 24 as well as the outlet area 31 of the outlet 10 must at least be designed such that in an open position of the emptying pipe 2 with respect to the container 3, the intermediate product which is manufactured in the container 3 can be transferred via the outlet area 31 of the outlet 10 of the container 3 and via the inlet area 30 of the inlet 24 into the emptying pipe 2.

The stirring device 5 preferably comprises flexibly designed stirring vanes 7. The stirring vanes 7 of the stirring device 5 can also be designed rigidly and/or at least partly flexibly. Due to an at least partial flexibility of the stirring vanes 7 of the stirring device 5, it is not absolutely necessary to bring the stirring device 5 into a defined position when bringing the emptying pipe 2 from a closure position into an open position, but the stirring device 5 can be simply stopped in the container 3 in an arbitrary position and remain there. The at least partly flexible stirring vanes 7 then yield on bringing the emptying pipe out of a closure position into an open position, on account of their flexibility, so that no damage to the stirring vanes 7 of the stirring device 5 and/or to the emptying pipe 2 occurs.

The intermediate product which is transferred into the emptying pipe 2 by way of the stirring device 5 which comprises stirring vanes 7 or by way of gravitational force is subsequently conveyed in the emptying pipe 2 in the longitudinal direction of the emptying pipe 2 along the middle axis E-E which lies in the section plane A-A by way of the conveying device 26 which in particular is designed as a conveying screw, spiral conveyor or the like. The conveying device 26 is hereby driven by a shaft 27 which is arranged on a middle axis E-E of the emptying pipe 2. By way of this, it is possible to drive the conveying device 26 for example by way of a drive unit, in particular a servomotor or torque motor, which is not shown here, and which is coupled to the shaft 27 preferably via a gear, so that the speed and in particular the angular speed of the conveying device 26 can be set in an exact manner.

The intermediate product, which is manufactured in the container 3, given the emptying procedure, i.e. in an open position of the emptying pipe 2 with respect to the container 3 is transported into the emptying pipe 2 by the stirring device 5 and/or the gravitational force. In the emptying pipe 2, the intermediate product is conveyed with an adjustable mass flow out of the device 1 by way of the conveying device 26. The mass flow which is generated by the conveying device is preferably constant. Due to the adjustable mass flow, with regard to the device 1 the emptying times can be reproduced in a precisely definable or defined manner and accordingly can be reproduced in an exact manner, in particular in dependence on the product characteristics.

The shaft 27 which drives the conveying device 26 is preferably designed as a hollow shaft, so that a rotor which is not shown here can be driven by way of a coaxial shaft in the shaft 27 which is designed as a hollow shaft 27. By way of this, it is possible to rotate the rotor, which is not represented, with a precisely adjustable speed in or opposite to the rotation direction of the shaft 27 by way of a separate drive unit which is likewise not shown. The speed of the shaft 27 as well as the speed of the coaxial shaft for the rotor which is not shown can be set and closed-loop controlled independently of one another.

The intermediate product which is conveyed in the emptying pipe 2 in the direction of the outlet 13 in a controlled manner exits out of the outlet 14 via the openings 16 of the sieve 38 of the sieve device 15 into the inlet 28 of the drying device 29 as a granulate or extrudates, said inlet being represented dashed. The rotor which is not shown shears the granulate or extrudate at the opening 16s of the sieve 38 of the sieve device 15, so that the particle size of the granulates and extrudates can be set in a targeted manner according to the speed of the rotor which is not represented. The granulates or extrudates are subsequently treated further, for example dried, coated or the like, in the drying apparatus 29 which is represented dashed. The granulates and extrudates can already be fluidised in the inlet of the drying apparatus 29, in order to simplify a transfer into the drying apparatus 29.

Figure 5:
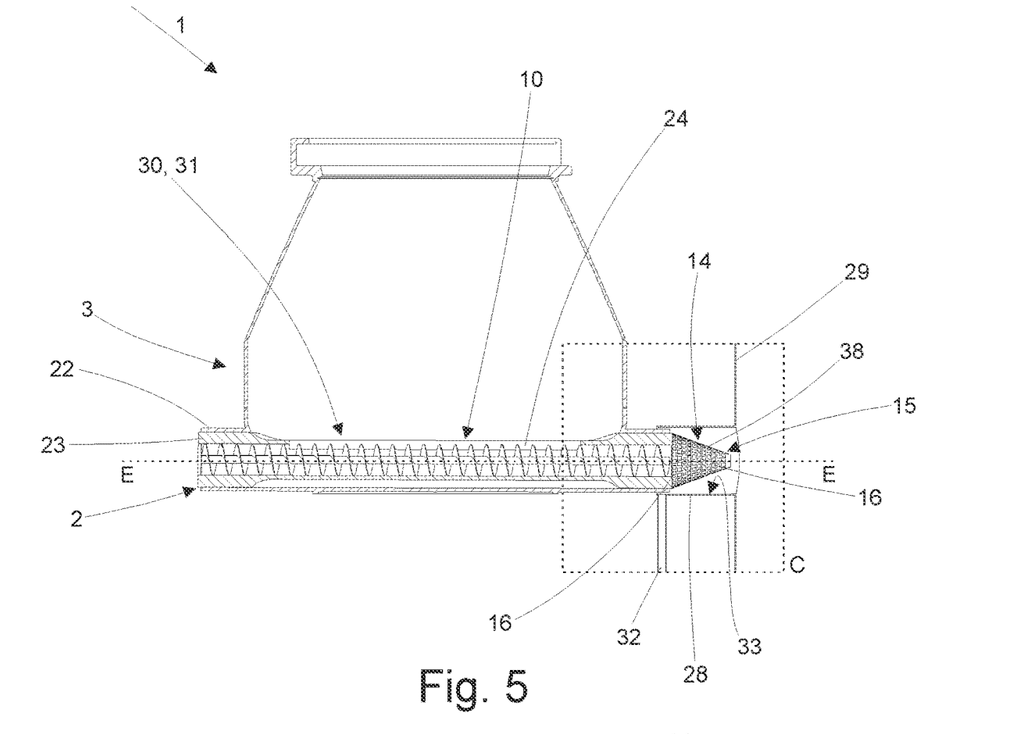

A section of the preferred device 1 according to section plane A-A in FIG. 4 with a detail C in the region of the outlet 14 of the emptying pipe 2 is shown in FIG. 5, wherein the emptying pipe 2 is situated in an open position and runs out into an inlet 28 of the drying apparatus 29.

The emptying pipe 2 is arranged in a wall 22 which forms a part of the container 3. In contrast to the FIGS. 1 to 3, the emptying pipe 2 which is shown in FIG. 5 is not situated in the closure position but in the open position. The inlet 24 of the emptying pipe 2 with its inlet area 3 faces in the direction of the container 3, so that the intermediate product which is manufactured in the container interior 21 of the container 3 from the fed material and fed liquid can be transferred via the outlet which comprises an outlet area 31 from the container 3 via the inlet 24 of the emptying pipe 2 into the emptying pipe 2.

The emptying pipe 2 of the device 1 comprises a conveying device 26. The conveying device 26 in the embodiment example is designed as a conveying screw with a constant flight depth. The conveying device 26 is driven by a shaft 27 which is arranged on a middle axis E-E of the emptying pipe. The conveying device 26 is driven by the shaft 27 via a drive unit, in particular a servomotor or torque motor, which is not shown here. By way of this, the rotation speed and in particular the angular speed of the conveying device 26 can be set in an exact manner. The conveying device 26 conveys the intermediate product which is transferred from the container 3 into the emptying pipe 2, in the direction of the outlet 14 of the emptying pipe 2.

At the outlet 14, the intermediate product as a granulate or extrudate is transported out of the openings 16 of the sieve 38 of the sieve device 15 into the inlet 28 of the drying apparatus 29. The granulates or extrudates which drop into the inlet 28 of the drying apparatus 29 can be fluidised in the inlet 28 of the drying apparatus 29. For this, the inlet 28 comprises a feed conduit 32, via which a fluidisation medium, in particular a gas such as for example air, can be fed. A transfer from the outlet out of the sieve 38 of the sieve device 15 of the emptying pipe 2 into the drying apparatus 29, preferably a fluidised bed or spouted bed apparatus, is encouraged or assisted by the fluidisation medium which can be fed via the feed conduit 32, so that a transfer conduit from the device 1 to the drying apparatus 29 is at least almost completely done away with. Particularly preferably, the inlet 28 of the drying apparatus 29 comprises an onflow base or is at least partly designed as an onflow base. An onflow base is designed for example in the form of a perforated plate, so that a fluidisation medium can penetrate through the onflow base and fluidises the granulates or extrudates, similarly to a fluidisation apparatus. This described embodiment is not shown. By way of an inlet 28 of the drying apparatus 20 which is designed in such a manner, the extrudate or granulate which exits out of the outlet 14 of the emptying pipe 2 of the device 1 is fluidised in a direct manner without the extrudate or granulate coming into contact with the inner surface 33 of the inlet 28 of the drying apparatus 29. A significantly reduced surface which is contacted by the product results by way of this and consequently a lower product loss, in comparison to a device 1 which is connected to a drying apparatus 29 via a transfer conduit.

Figure 6:
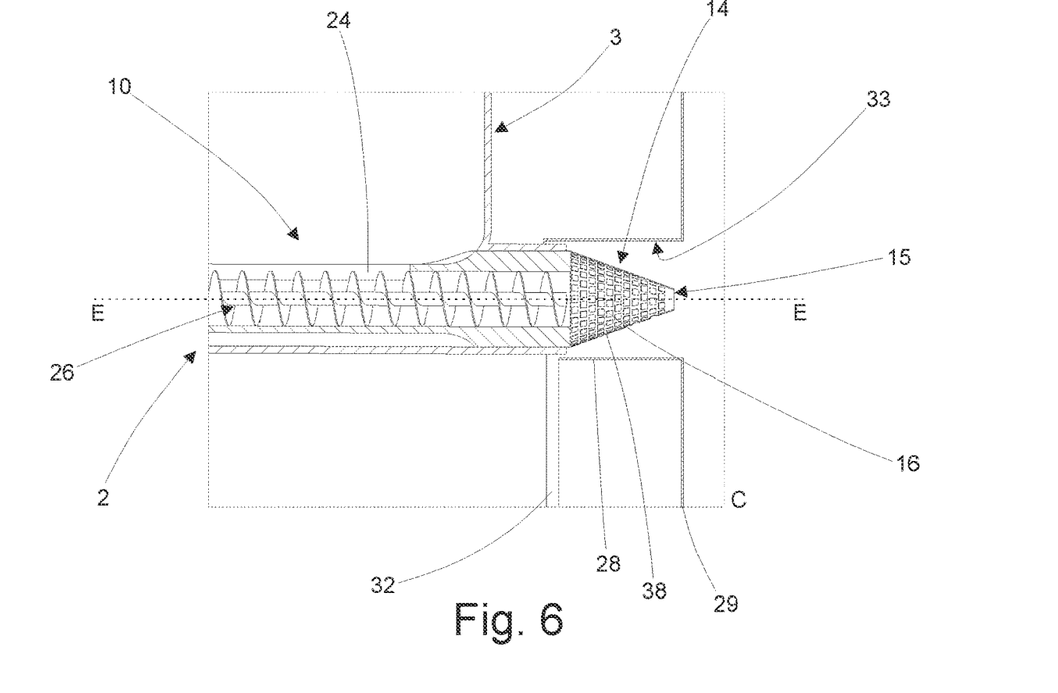

FIG. 6 shows a detailed view in the region of an outlet 14 of the emptying pipe 2 according to detail C in FIG. 5, wherein the emptying pipe 2 is situated in an open position and runs out into an inlet 28 of the drying apparatus 29.

The intermediate product which is manufactured in the container 3 is conveyed via the outlet 10 of the container 3 which has the outlet area 31 and via the inlet 24 of the emptying pipe 2 in the open position which has the inlet area 30, into the emptying pipe 2 by way of stirring device 5 which comprises stirring vanes 7. In the emptying pipe 2, the intermediate product is conveyed by way of the conveying device 26 in the direction of the outlet 14 of the emptying pipe 2 and subsequently through openings 16 of the sieve 38 of the outlet 14 which is designed as a sieve device 15, so that granulates or extrudates arise. Particularly preferably, the intermediate product is sheared away by way of a rotor which is not represented here before the passage through the openings 16 of the sieve 38 of the sieve device 15. The thus manufactured granulates or extrudates drop into the inlet 28 of the drying apparatus 29 and are treated further in the drying apparatus 29, in particular a fluidisation apparatus. For an improved transfer into the drying apparatus 29, the inlet 28 which has an inner area 33 comprises a feed conduit 32 for a fluidisation medium, such as for example air. In a further embodiment example, the outlet 14 of the emptying pipe 2 can project into the fluidised bed of the drying apparatus 29. Due to this, the feed conduit 32 would not be present, but despite this the granulate or extrudate would be brought into the fluidised bed in a direct manner and fluidised there. The method for emptying the device 1 for manufacturing granulates or extrudates is described in the context of the device 1 which is explained in FIGS. 1 to 6.

In a first method step, the intermediate product is manufactured in the container interior 21 of the container 3 which is closed by the emptying pipe 2, from the fed material which is to be treated, and from the fed liquid, wherein the stirring device 5 is at least temporarily active, thus is rotated for example by the drive unit which is not shown. Thus, in the first method step an intermediate product can be manufactured in the container 3 from a material to be treated and a liquid, in order in further method steps to subsequently transport the intermediate product out of the device 1 via the emptying pipe 2 which comprises a conveying device 26 and which is situated in the open position and to granulate or extrude it.

In a second method step, the emptying pipe 2 is subsequently brought out of the closure position with respect to the container 3 into an open position with respect to the container 3. Advantageously, for this the emptying pipe 2 is rotated about a rotation angle of 180° in the clockwise or anti-clockwise direction. Other rotation angles are possible and conceivable, in order to rotate the emptying pipe 2 out of the closure position into an open position. The rotating of the emptying pipe 2 is effected either manually or in an automated manner, for example by way of a drive unit such as a torque motor or servomotor. By way of this, the outlet area 31 of the outlet 10 of the container 3 and the inlet area 30 of the inlet 24 of the emptying pipe 2 overlap at least partly, so that the intermediate product can be transferred out of the container 3 into the emptying pipe 2.

Subsequently, in the third method step, the intermediate product is transported out of the container 3 and via the conveying device 26 of the emptying pipe 2 out of the outlet 14 of the emptying pipe 2. The intermediate product, which is manufactured in the container 3, given the emptying procedure is transported by the stirring device 5 and/or gravitational force into the emptying pipe 2 and there is conveyed out of the device 1 with an adjustable, preferably constant mass flow by way of the conveying device 26. On account of this, concerning the device 1 according to the invention, the emptying times can be defined or are defined in an exact manner and are reproducible in a precise manner, in dependence on the product characteristics.

For this, the stirring device 5 is advantageously moved into a predefined position before the second method step. The stirring device 5 can be displaced into the predefined position for example by way of a drive unit. The stirring device 5 which is driven for example at a certain angular speed can be stopped in a targeted manner at every position in the container 3. It is also possible to lift or lower the stirring device 5 in its height by way of the telescopic drive shaft 4. This is advantageous for bringing the emptying pipe 2 from a closure position into an open position and vice versa, since the stirring device 5 and/or the container 3 are not damaged by way of this.

The device 1 preferably comprises a drying apparatus 29 and the extrudate or granulate which exits out of the outlet 14 of the emptying pipe 2 according to the third method step is treated further, in particular dried or coated, in the drying apparatus 29. For this, the inlet 28 of the drying apparatus 29 preferably comprises a feed conduit 32 for fluids, in particular gases.

By way of introducing a fluid, in particular a fluidisation gas, preferably an inert gas, via the feed conduit 32, the passage of the extrudate or granulate which exits out of the outlet 14 which comprises openings 16 and is designed as a sieve device 15, into the drying apparatus 29, preferably fluidised bed or spouted bed apparatus, is encouraged or assisted.

Particularly preferably, the inlet 28 of the drying apparatus 29 comprises an onflow base or is at least partly designed as an onflow base. By way of an inlet 28 of the drying apparatus 29 which is designed in such a manner, the extrudate or granulate which exits out of the outlet 14 of the emptying pipe 2 of the device 1 is fluidised in a direct manner without the extrudate or granulate coming into contact with the inner surface 33 of the inlet 28 of the drying apparatus 29. Hence, a further reduced surface which is contacted by the product results and consequently a reduced product loss.

Furthermore, the device 1 comprises a further nozzle, in particular a cleaning nozzle, so that in a further method step the device 1 at least temporarily can be cleaned during the closure position. In the closure position, it is possible to free or to clean the device 1, in particular the interior of the emptying pipe 2, from product residues during the manufacture of the intermediate product in the container 3, so that the emptying pipe 2 is clean given the next emptying of the container 3 and the new charge can be transported or conveyed out of the device 1 free of contaminations or residues of the previous charge. For this, the nozzle which is not shown is preferably arranged on a rail. By way of this, the nozzle can be optimally positioned along the inlet 24 of the emptying pipe 2 of the device 1, in order to be optimally clean every nook and cranny of the emptying pipe 2. Very particularly preferably, the nozzle which is arranged on the rail can be arranged or is arranged in a displaceable manner in the longitudinal direction and transverse direction to the inlet 24. By way of the displaceability of the nozzle in particular in the transverse direction to the inlet 24, i.e., closer onto the inlet 24, contaminations or residues of the previous charge can be removed in an improved manner and the emptying pipe 2 can therefore be optimally cleaned.

According to an advantageous embodiment of the method according to the invention, the device 1 for carrying out the method is a device 1 which is described in the FIGS. 1 to 9.

Figure 7:
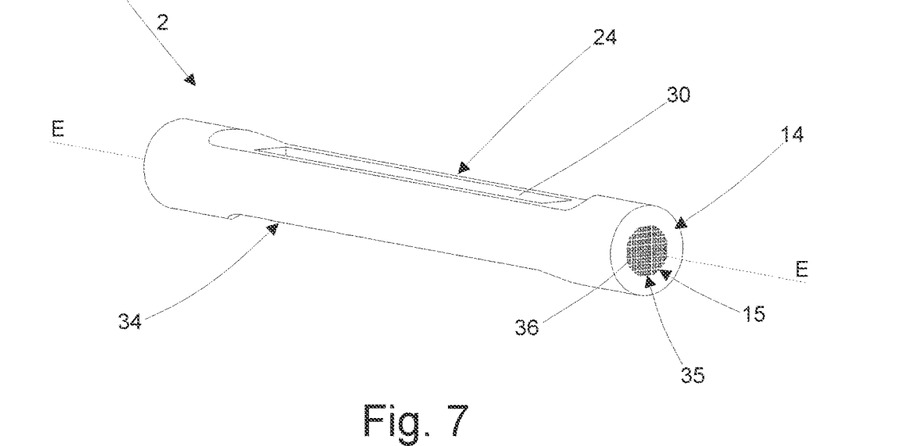

FIG. 7 represents a perspective representation of a first embodiment of the emptying pipe 2.

The emptying pipe 2 in a first embodiment, for the most part has a cylindrical shape. The emptying pipe 2 comprises an inlet 24 which has an inlet area, wherein the inlet 24 in its shaping is adapted to the base 6 of the container 3, so that the stirring device 5 which comprises stirring vanes 7 is rotatable in the open position. By way of this, it is possible to transfer the intermediate product out of the container interior 21 of the container 3 into the emptying pipe 2 in the open position.

Furthermore, the emptying pipe 2 comprises a recess 34 which in its shaping is likewise adapted to the base 6 of the container which is not shown here, so that the stirring device 5 which comprises stirring vanes 7 is rotatable in the closure position, in order to be able to manufacture the intermediate product from the material which is fed to the container 3 and from the liquid which is fed to the container 3, without transporting the intermediate product into the emptying pipe 2.

The emptying pipe 2 in a first embodiment according to FIG. 7 comprises a conveying device 26 which is not visible and which in particular is designed as a conveying screw, spiral conveyor or the like and conveys in the longitudinal direction of the emptying pipe 2 along the middle axis E-E. The emptying pipe 2 for the most part has a cylindrical shape. The emptying pipe 2 can also assume any other geometric shape.

The first embodiment of the emptying pipe 2 comprises an outlet 14 in the form of a sieve device 15 which is designed as a holed plate 35. The holed plate 35 of the sieve device 15 in the shown embodiment has equally large openings 36. Differently large openings 36 in the holed plate 35 of the sieve device 15 are conceivable. A narrow size distribution of the exiting extrudate can be achieved by the equally large openings 36 of the holed plate 35 of the sieve device 15 in the first embodiment of the emptying pipe 2, so that the same or similar particles can be produced. These equal or similar particles can be subsequently rounded, so that equally large, small balls, for example for a capsule filling, arise.

Figure 8:
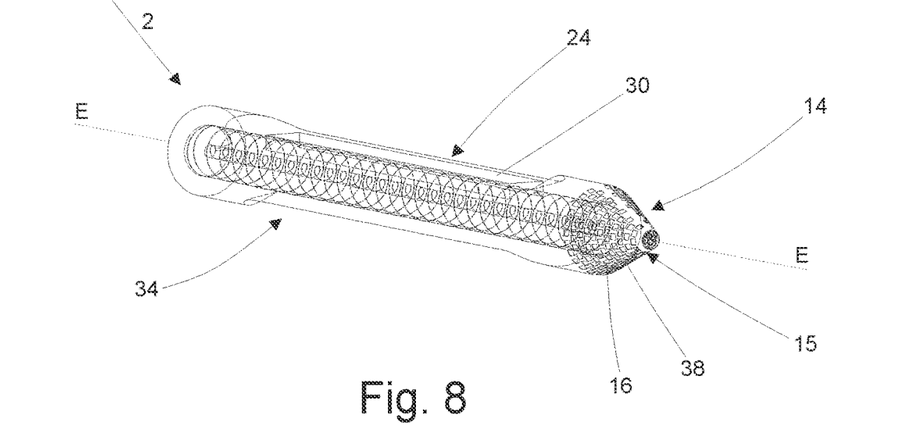

A perspective representation of a second embodiment of the emptying pipe 2 is shown in FIG. 8, wherein the representation shows a conveying device 26 which is schematically shown in the inside of the emptying pipe 26.

The emptying pipe 2 has a largely cylindrical shape in a second embodiment. The emptying pipe 2 can also assume any other geometric shape. The emptying pipe 2 comprises an inlet 24 which as an inlet area, wherein the inlet 24 is adapted in its shaping to the base 6 of the container 3 which is not shown here, so that the stirring device 5 which comprises the stirring vanes 7 is rotatable in the open position and the intermediate product can be transferred out of the container 3 into the emptying pipe 2 in the open position.

Furthermore, the emptying pipe 2 comprises a recess 34 which is likewise adapted in its shaping to the base 6 of the container, so that the stirring device 5 which comprises the stirring vanes 7 is rotatable in the closure position, in order to be able to manufacture the intermediate product from the material which is fed to the container 3 and the from liquid, which is fed to the container 3, without conveying the fed material or the fed liquid into the emptying pipe 2.

In a second embodiment according to FIG. 8, the emptying pipe 2 comprises a conveying device 26 which has a constant flight depth, conveys in the longitudinal direction of the emptying pipe 2 along the middle axis E-E in the direction of the outlet 14 and in particular is designed as a conveying screw, spiral conveyor, or the like. The conveying device 26 and the rotor which is not represented are preferably designed as one piece as a component unit of the emptying pipe 2.

In the second embodiment, the emptying pipe 2 comprises an outlet 14 which is designed as a sieve device 15 and which comprises openings 16. The sieve 38 of the sieve device 15 which is designed in a cone-shaped manner has equally large openings 16 in the shown embodiment. Differently large openings 16 in the sieve 38 of the sieve device 15 are possible. In the second embodiment of the emptying pipe 2, a wide size distribution of the granulate, in particular according to the Gaussian distribution is achieved by way of the sieve 38 of the sieve device 15. The manufactured granulates comprise a porous, non-uniform structure. The granulates with a broad grain size distribution which are manufactured in a device 1 with an emptying pipe 2 according to FIG. 8 are suitable for example for being pressed into tablets.

Figure 9:
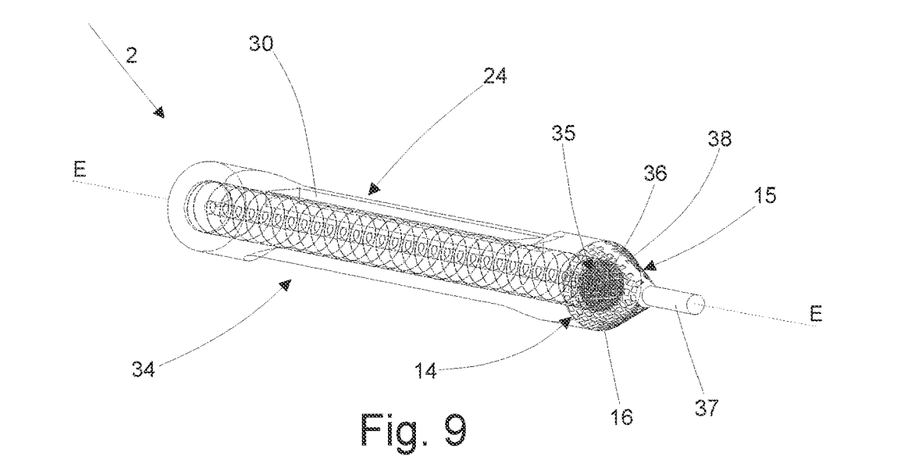

A perspective representation of a third embodiment of the emptying pipe 2 is represented in FIG. 9, wherein the representation shows a schematically shown conveying device 26. The conveying device 26 and the rotor, which is not shown, in the embodiment example are designed in a multi-part manner as different component units. A single-part component unit of the conveying device 26 and rotor, as described in FIG. 8, is likewise possible.

The third embodiment of the emptying pipe 2 according to FIG. 9 in contrast to the second embodiment which is shown in FIG. 8, at the outlet 14 comprises a holed plate 35 which has equal large openings 36, as well as a shaft 37 for driving a rotor which is not shown here, and which shears away the granulates in the inside at the openings 16 of the sieve 38 of the sieve device 15. By way of this, granulates with a narrower size distribution can be manufactured.

All features of the emptying pipe 2 which are represented in FIGS. 7 to 9 as well as the further features of the emptying pipe 2 which is shown in FIGS. 1 to 6 can be applied in an arbitrary combination. For example, the rotor of the sieve device 15 according to FIG. 9, said rotor not having been represented, can also be driven via a drive unit which is a likewise not represented, also by way of a coaxial shaft 27 which is designed as a hollow shaft.

The invention claimed is:

1. A method for emptying a device for manufacturing granulates or extrudates, wherein the device comprises a container with an inlet for the material to be treated, an inlet for a liquid, a stirring device for manufacturing an intermediate product from the material to be treated and from the liquid in a batch process, an outlet for the intermediate product, and an emptying pipe, wherein said emptying pipe comprising an inlet for the intermediate product and an outlet for the granulate or extrudate as well as a conveying device which conveys the intermediate product from the inlet of the emptying pipe in the direction of the outlet of the emptying pipe, wherein the emptying pipe which is rotatable about an axis E-E is arranged on the container in a manner such that the emptying pipe with respect to the container can be brought between an open position and a closure position, the method comprising the steps of:

a) manufacturing the intermediate product from the material to be treated and from the liquid in the container which is closed by the emptying pipe, wherein the stirring device is at least temporarily active and the emptying pipe is in the closure position during the manufacturing of the intermediate product,     b) after completing the manufacturing of the intermediate product in step a), bringing the emptying pipe out of the closure position with respect to the container into an open position with respect to the container, and     c) conveying the intermediate product manufactured in step a) out of the container and via the conveying device of the emptying pipe out of the outlet of the emptying pipe.

2. The method according to claim 1, wherein the stirring device is brought into a defined position before step b).

3. The method according to claim 2, wherein the stirring device is moved into a defined position by way of lifting or that stirring vanes of the stirring device are stopped at a predefined angle in the container.

4. The method according to claim 3, wherein upon bringing the emptying pipe out of the closure position with respect to the container into an open position with respect to the container according to step b), the emptying pipe is rotated about an angle of 10° to 300°.

5. The method according to claim 3, wherein upon bringing the emptying pipe out of the closure position with respect to the container into an open position with respect to the container according to step b), the emptying pipe is rotated in a manual or automated manner.

6. The method according to claim 3, wherein the device further comprises a fluidisation apparatus and the extrudate or granulate which exits out of the outlet of the emptying pipe according to step c) is treated in the fluidisation apparatus.

7. The method according to claim 3, wherein the device further comprises a further nozzle, wherein the device is cleaned at least temporally during the closure position.

8. The method according to claim 2, wherein upon bringing the emptying pipe out of the closure position with respect to the container into an open position with respect to the container according to step b), the emptying pipe is rotated about an angle of 10° to 300°.

9. The method according to claim 2, wherein upon bringing the emptying pipe out of the closure position with respect to the container into an open position with respect to the container according to step b), the emptying pipe is rotated in a manual or automated manner.

10. The method according to claim 2, wherein the device further comprises a fluidisation apparatus and the extrudate or granulate which exits out of the outlet of the emptying pipe according to step c) is treated in the fluidisation apparatus.

11. The method according to claim 2, wherein the device further comprises a further nozzle, wherein the device is cleaned at least temporally during the closure position.

12. The method according to claim 1, wherein upon bringing the emptying pipe out of the closure position with respect to the container into an open position with respect to the container according to step b), the emptying pipe is rotated about an angle of 10° to 300°.

13. The method according to claim 12, wherein the device further comprises a fluidisation apparatus and the extrudate or granulate which exits out of the outlet of the emptying pipe according to step c) is treated in the fluidisation apparatus.

14. The method according to claim 12, wherein the device further comprises a further nozzle, wherein the device is cleaned at least temporally during the closure position.

15. The method according to claim 1, wherein upon bringing the emptying pipe out of the closure position with respect to the container into an open position with respect to the container according to step b), the emptying pipe is rotated in a manual or automated manner.

16. The method according to claim 15, wherein the device further comprises a fluidisation apparatus and the extrudate or granulate which exits out of the outlet of the emptying pipe according to step c) is treated in the fluidisation apparatus.

17. The method according to claim 15, wherein the device further comprises a further nozzle, wherein the device is cleaned at least temporally during the closure position.

18. The method according to claim 1, wherein the device further comprises a fluidisation apparatus and the extrudate or granulate which exits out of the outlet of the emptying pipe according to step c) is treated in the fluidisation apparatus.

19. The method according to claim 18, wherein the device further comprises a further nozzle, wherein the device is cleaned at least temporally during the closure position.

20. The method according to claim 1, wherein the device further comprises a further nozzle, wherein the device is cleaned at least temporally during the closure position.

* * * * *

UNITED STATES PATENT AND TRADEMARK OFFICE
CERTIFICATE OF CORRECTION

PATENT NO.         : 12,311,334 B2
APPLICATION NO.    : 17/602523
DATED              : May 27, 2025
INVENTOR(S)        : Dirk Zimmermann Page 1 of 1

It is certified that error appears in the above-identified patent and that said Letters Patent is hereby corrected as shown below:

On the Title Page

Column 2, item (57) Abstract, Line 15, delete "devices." and insert -- device. --

In the Specification

Column 1, Line 10, delete "May 10, 2019," and insert -- Apr. 10, 2019, --

Signed and Sealed this
Nineteenth Day of August, 2025

Coke Morgan Stewart
*Acting Director of the United States Patent and Trademark Office*